United States Patent [19]
Webb et al.

[11] 3,898,042
[45] Aug. 5, 1975

[54] METHOD AND APPARATUS FOR CONTINUOUSLY DETERMINING TOTAL COPPER IN AN AQUEOUS STREAM

[75] Inventors: Benton P. Webb, Richwood; Gordon R. Bullard, Lake Jackson, both of Tex.

[73] Assignee: The Dow Chemical Company, Midland, Mich.

[22] Filed: Jan. 2, 1974

[21] Appl. No.: 430,307

[52] U.S. Cl. ............... 23/230 R; 23/253 R; 23/292; 259/4; 259/DIG. 46
[51] Int. Cl. ..................... G01n 21/02; G01n 29/00
[58] Field of Search ...... 23/230 R, 253 R, 259, 292; 259/DIG. 46

[56] References Cited
UNITED STATES PATENTS

| | | | |
|---|---|---|---|
| 3,098,719 | 7/1963 | Skeggs | 23/253 R |
| 3,137,543 | 6/1964 | Barton et al. | 23/230 R |
| 3,284,164 | 11/1966 | Hach | 23/253 R |
| 3,540,857 | 11/1970 | Martin | 23/253 R X |
| 3,572,994 | 3/1971 | Hochstrasser | 23/230 R |
| 3,621,855 | 11/1971 | Rabinowitz | 259/DIG. 46 X |
| 3,690,833 | 9/1972 | Ferrari | 23/230 R |

Primary Examiner—Joseph Scovronek
Attorney, Agent, or Firm—Edward E. Schilling; Glenn H. Korfhage

[57] ABSTRACT

A method for continuously determining the total copper content of an aqueous analysis stream containing at least about one part per billion total copper in at least one of ionic, particulate, and complexed forms which comprises: (a) providing a stream analysis instrument having a flow-through type cell and adapted for continuous measurement of light absorbance at about 435 nm; (b) contacting and intimately admixing the analysis stream with a continuous flow of hydrofluoric acid; (c) continuously filtering the acid-treated stream prior to introduction of said stream into the cell of the stream analysis instrument; (d) continuously adding to and mixing with the analysis stream an aqueous solution of a chelant-buffer reagent selected from the group consisting of ammonium and alkali metal citrates and one of the ammonium and alkali metal salts of nitrogen-containing chelates having from 1 to 5 carboxyl groups, or a mixture thereof, the quantity of the reagent being sufficient to adjust the pH of the stream to from about 6 to about 7; (e) continuously adding to and mixing with the analysis stream an aqueous solution of a water soluble dithiocarbamate reagent whereby a complex thereof is formed with the copper present in the buffered stream; (f) quantitatively detecting said complex by measuring, by means of the stream analysis instrument, the light absorbance of the treated stream at 435 nm; and (g) comparing the absorbance of the treated stream to that of similarly treated standard solutions of known copper content. An apparatus adapted to accomplishing this method is also described.

30 Claims, 2 Drawing Figures

METHOD AND APPARATUS FOR CONTINUOUSLY DETERMINING TOTAL COPPER IN AN AQUEOUS STREAM

INTEREST OF THE UNITED STATES GOVERNMENT

The Government has reserved rights in this invention, which was made in the course of or under Contract No. 14-30-3035 awarded by the Office of Saline Water, U.S. Department of the Interior.

DEFINITIONS

For purposes of the following description and the appended claims, the following definitions shall apply:

"Ionic copper" shall denote free, uncombined copper cations dissolved in aqueous solution.

"Complexed copper" shall denote cations dissolved in aqueous solution, said cations comprising at least one copper atom bonded to at least one non-copper atom by coordinate, covalent bonds.

"Particulate copper" shall include elemental copper, having a zero valence state, and water-insoluble copper-containing compounds which are suspended, i.e., dispersed or carried, in a given aqueous stream.

"Total copper" shall denote the sum of the copper carried by an aqueous stream in all three of the foregoing forms.

"Chelant-buffer" shall denote a chelating agent which in addition to its chelating properties, is also a proton acceptor capable of raising to a pH of at least about 6, the pH of an aqueous hydrofluoric acid solution having a pH of about 2.

"Bulk test stream" shall denote the gross effluent stream or other aqueous stream being monitored.

"Test stream sample" shall denote that segment of the bulk test stream diverted for analysis.

"Analysis stream" shall denote the stream passing through the analytical apparatus, comprising the test stream sample and the various reagents as each is add thereto.

Other definitions and clarification of terms are contained in the body of the following description where appropriate.

BACKGROUND OF THE INVENTION

Unless careful water chemistry controls are observed, copper can be a contaminant of significant importance in industrial water and in industrial waste water. In the widely used distillation processes for the desalting of sea water and other brackish water which have historically employed apparatus constructed of substantial quantities of copper alloys, for example, copper can be a potentially harmful contaminant in the brine effluent streams. The copper contributed by the corrosion of the copper alloys occurring in such operations because of unsuitable water chemistry conditions, when added to that which may have already been present in the untreated sea water, causes copper to be carried in the effluent stream is essentially three forms, namely, ionic, complexed, and particulate.

Studies have indicated that the upper limit of total copper concentration for maintaining recommended water quality standards lies in the low parts per billion (ppb) range. Heretofore, however, there has been no effective, economical means available enabling those discharging water into the environment to monitor the total copper concentration of their effluent at such low concentrations on a continuous basis.

While several methods for measuring low copper concentration are known, none is easily adapted to a continuous process. Moreover, in all of these methods, the particulate form of copper is removed prior to analysis and treated separately. In the so-called neocuproine methods, for example, the sample must be filtered, the filter ashed, treated with hydrofluoric acid, dried, treated again with hydrochloric acid, and warmed. This medium is then added to the original filtrate, the mixture treated with a reducing agent, and the pH adjusted with a buffer. Neocuproine is added and the resulting copper-neocuproine complex is extracted with chloroform. After separation and filtering, a spectrophotometric determination is made on the chloroform layer and compared with that of known standards. While precise determinations at low concentrations can be made by this method, it is readily apparent to those skilled in the art that it is a method suitable for the laboratory on a batch basis, but it is clearly not readily adapted to a continuous process.

Brooks et al., Anal. Chim. Acta 37 (3), 321 (1967), report detection of copper in sea water to a sensitivity of about 0.1 ppb using atomic absorption techniques, but the method used in that work again involves a solvent extraction step. Moreover, experience has shown that without the solvent extraction step salt tends to crystallize on the aspirator slit. Accordingly, while suitable as a batch process, this method also has serious limitations which render it unsuited to continuous automated analysis.

Neutron activation analysis is also essentially limited to a batch operation in that the copper must be chelated on an ion exchange product and chelating resin, and then extracted into hydrochloric acid. Thus, in addition to the high cost of the necessary equipment, the complicated preparatory steps are not conducive to continuous automated analysis.

Similarly, for various reasons, other known techniques such as, for example, polarographic analysis, coulometric titration, and specific ion electrode analysis are not suited to measuring total copper on a continuous basis.

Accordingly, it is a primary objective of this invention to provide a method for continuously determining the total copper content of an aqueous stream containing or carrying a total copper content in the range of from about 1 ppb to about 4 parts per million (ppm), the ionic, particulate, and complexed forms, and to provide an apparatus for carrying out such a method.

It is a further object of this invention to provide such a method and apparatus which are practical, dependable, and economical.

A specific objective is to provide a method and apparatus for continuously monitoring the total copper content of aqueous industrial waste streams being discharged into the environment, particularly those from desalinization plants.

A still more specific objective is to accomplish the foregoing using a photometric system adapted to continuous analysis.

Further objectives directed toward the apparatus aspect of this invention are to provide a system which is easily cleaned and maintained and one which incorporates readily available parts for easy construction and repair, while at all times considering maximum safety standards.

SUMMARY OF THE INVENTION

The objectives hereinbefore set forth and others are met by the advantages found in the present invention — which is a continuous method, accomplished without need for a solvent extraction step — for converting into ionic form essentially all of the copper carried by an aqueous stream, forming a copper-dithiocarbamate complex, and measuring the absorbance of the complex at a wave length of about 435 nm on a stream analysis instrument adapted for making continuous measurements. The absorbance of the treated stream is then compared with a calibration curve prepared by plotting the same optical property of known standard samples which are similarly treated, and the concentration of copper in the bulk test stream is thus determined.

Generallly, the practice of this invention comprises:

a. providing a stream analysis instrument having a flow-through type cell adapted for continuous measurement of light absorbance at about 435 nm;

b. contacting and intimately admixing the analysis stream with a continuous flow of hydrofluoric acid;

c. continuously filtering the acid-treated analysis stream prior to introduction of said stream into the cell of the stream analysis instrument;

d. continuously adding to and mixing with the analysis stream an aqueous solution of a chelant-buffer reagent selected from the group consisting of ammonium and alkali metal citrate and one of the ammonium and alkali metal salts of nitrogen-containing chelate having from 1 to 5 carboxyl groups, or a mixture thereof, the quantity of reagent being sufficient to adjust the pH of the analysis stream to from about 6 to about 7;

e. continuously adding to and mixing with the analysis stream an aqueous solution of a water soluble dithiocarbamate reagent whereby a complex thereof is formed with the copper present in the buffered stream;

f. quantitatively detecting said complex by measuring, by means of the stream analysis instrument, the light absorbance of the treated stream at a wave length of about 435 nm; and g. comparing the absorbance of the treated stream to that of similarly treated standard solutions of known total copper content to determine the total copper content of the untreated analysis stream.

An apparatus adapted to carry out the process of this invention and others comprises, in its broadest aspects:

a. a first mixing chamber;

b. controllable inlet means connected to said mixing chamber for feeding an analysis stream into said chamber at a controlled, preselected rate;

c. controllable inlet means connected to said mixing chamber for feeding a first reagent into said chamber at a controlled, preselected rate;

d. outlet means connected to said mixing chamber for removing an analysis stream from said mixing chamber;

e. controllable inlet means connected to said analysis stream outlet means for introducing second and third reagents into the analysis stream at controlled, preselected rates;

f. a stream analysis instrument having a flow-through type cell and adapted for continuous quantitative determination of light absorbance by a fluid stream, said instrument being connected to said analysis stream outlet means downstream from said means for introducing second and third reagents; and g. means for intimately blending the second and third reagents with the analysis stream prior to introduction of such stream into the cell of the stream analysis instrument.

FURTHER DESCRIPTION OF THE INVENTION

Figure 1:
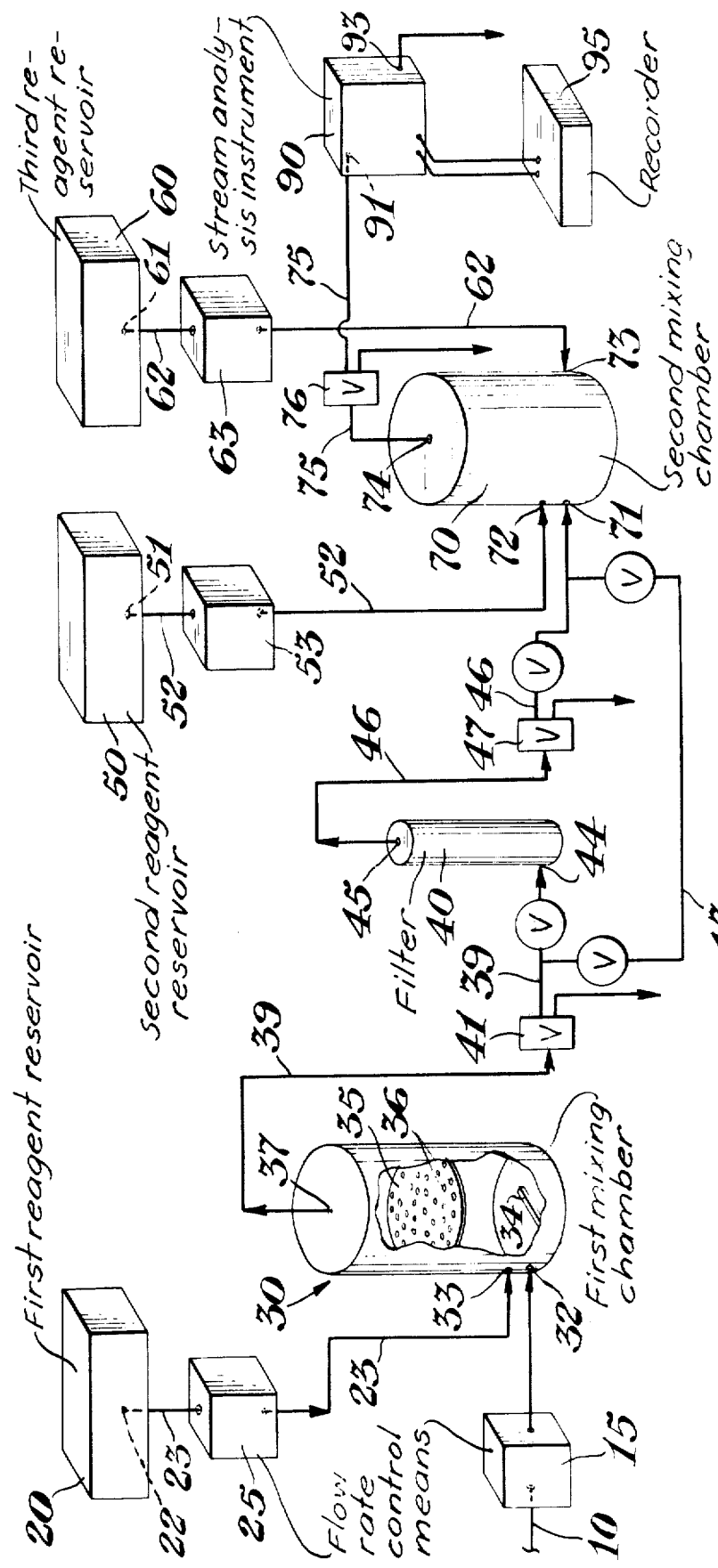
FIG. 1 is a view partly schematic, and partly in perspective, that which is in perspective being partly broken away and in section, showing an apparatus constructed in accordance with the needs of this invention.

The method and apparatus of this invention are employed to analyze for total copper in streams having a copper content of at least about 1 ppb. The maximum total copper concentration for which the method is directly useful depends in part on the capabilities of the stream analysis instrument employed, particularly on the path length of the optical cell. Also of importance in determining the maximum concentration at which this invention can be employed directly is the behavior of the plot of percent transmittance versus concentration for the copper-dithiocarbamate complex. Beer's law is generally valid up to a concentration of about 2 ppm. Compare ASTM Nonreferee Method D-1688(C), Paragraph 27. However, the method of this invention is nevertheless useful at concentrations above 2 ppm, even though the curve is not precisely linear, at least up to concentrations at which the curve eventually deviates significantly from Beer's law, i.e., up to concentrations where colorimetric methods are inoperable in that optical measurements are not sufficiently sensitive both to distinguish between significantly different concentrations and to give reproducible results for identical concentrations. Generally, then while the upper limit of direct utility may arguably be somewhat less depending on the particular standards of precision and accuracy demanded, the invention is, broadly speaking, operable up to concentrations of about 4 ppm copper.

The method is also conveniently applied to more concentrated streams, however, simply by adding the additional step of diluting the sample with a known quantity of copper-free water. Theoretically, the invention is also useful to determine the total copper in less concentrated solutions by, for example, evaporating an amount of water sufficient to bring the concentration of the resulting solution within the general range set forth above. As a practical matter, however, it is unlikely that this invention would be employed for such purpose because of the time delay involved in pre-concentrating the solution and because such low levels of copper are generally considered to be of little concern in the areas where this invention is expected to find its greatest application. Nevertheless, the claims are to be construed as embracing methods employing either of such dilution or concentration steps which are otherwise within the literal scope of the claims.

In the usual practice of this invention, a representative sample of an entire bulk test stream is diverted to pass through the analyzing apparatus of this invention with the balance of the bulk test stream going to waste.

The claims are also to be construed, however, as embracing equivalent embodiments such as those wherein an entire bulk test stream is passed through the apparatus, or, wherein the analysis stream is further, divided after one or more steps in the method have been performed, for example, after acid treatment, and/or after filtering and the like.

It is also to be understood that the term "continuous method" and similar phrases which appear throughout both the specification and claims are used primarily to distinguish this invention from batchwise methods. Thus, included within the ambit of "continuous" as used herein are the obvious alternatives of time sharing the apparatus between two or more similar bulk test streams on an alternating basis, or, manually taking frequent periodic readings at intervals of, for instance, from about 15 seconds to about 15 minutes, rather than using a strip chart recorder as is preferred. Also considered to be within the scope of this invention are embodiments wherein the stream analysis instrument is directly connected to a closed loop regulating device adapted to adjust automatically parameters affecting the composition of the bulk test stream such that no actual strip chart recorder or manual determinations of the concentration of the particular species are necessary.

A. Method

In order to analyze for total copper on a continuous basis, it is necessary to convert to a common form all forms — ionic, complexed, and particulate copper — which may be present in the test stream sample. In the practice of this invention, essentially all of the copper present in the test stream sample is converted into an ionic form by treatment with hydrofluoric acid and the analysis stream is thereafter adjusted to the proper pH and contacted with a complex forming reagent to form a copper-dithiocarbamate complex, the concentration of which is determined by photometric analysis.

Other conversion methods were investigated, but the hydrofluoric acid conversion method of this invention was found to be superior. For example, copper-containing samples were treated with iron-ethylenediaminetetraacetate (EDTA) and excess EDTA to oxidize the particulate copper to an ionic form and thereafter form a copper-EDTA complex. However, the copper-EDTA complex is not useful as an analytic means at low concentrations because the energy absorption of the complex is insufficient. Moreover, it was found that hydrofluoric acid employed in the practice of this invention is a much superior reagent than other acids for continuous conversion of the copper to ionic form. It was found, for example, that the effectiveness of hydrofluoric acid is much less temperature dependent than is that of, say, nitric acid or hydrochloric acid. Furthermore, hydrofluoric acid was found to be sufficiently effective at significantly lower concentrations than other acids.

The hydrofluoric acid is typically introduced into the analysis stream in the form of an aqueous solution. The concentration of said solution and the rate of flow into the analysis stream depend on the rate of flow of the analysis stream and on the approximate quantities of complexed and particulate copper carried by the stream. Those skilled in the art will readily be able to arrive at a proper balance of acid concentration, analysis stream flow rate, and acid flow rate in order to effect a pH of from about 1 to about 3 after the acid injection.

It is generally preferred for safety reasons to use a somewhat dilute solution of the acid, say, from about 2.5 to about 10 weight percent HF. In one particular application, one part concentrated (48 weight percent) hydrofluoric acid was diluted with 9 parts water by volume and the resulting solution (about 5.4 weight percent HF) was injected at a rate of 3 milliliters per minute (ml/min) into a test stream flowing at a rate of 100 ml/min.

Following treatment with the hydrofluoric acid, the analysis stream is somewhat turbid. The bulk of this turbidity is attributed to silica, much of which is freed when the copper is converted to ionic form. In order to obtain precise analytical results at low copper concentrations, either the colorimetric readings must be adjusted to compensate for this turbidity factor or the turbudity must be removed from the stream prior to the colorimetric analysis. While it may be sufficient to compensate for such turbidity on a batch basis, compensation is not suitable where a continuous process is employed. At least one deficiency of such a technique is that the degree of turbidity varies somewhat depending on the composition of the particular segment of the stream passing through the system at any given time. Moreover, in addition to affecting the analytical data, the presence of suspensions in the analysis stream is also detrimental to the equipment over a period of time since the suspensions tend to deposit onto the equipment, particularly in low velocity segments of the system. Accordingly, though the filtration step may be carried out at any juncture between the acid treatment step and the actual entrance of the analysis stream into the flow-through cell of the stream analysis instrument, it is highly advantageous to do so immediately following the acid treatment step.

Cartridge-type filter elements having what are known in the trade as pore size ratings in the range of from about 0.1 microns to about 5 microns, but preferably from about 0.5 microns to about 2.0 microns, are satisfactory for use in this invention. However, since the suspension causing the turbidity is removed by clinging to a surface rather than by being physically trapped by a filter in the conventional sense, a filter comprised of a container packed with, say, glass wool or cotton is superior. The use of such a filtration system is preferred to a cartridge filter element not only because of performance, but also because of the availability of the raw materials and the low cost involved. Moreover, such packing is more easily replaced than is a cartridge filter element, thus simplifying routine maintenance. Of course, those skilled in the art will recognize that a filter comprised of medical grade cotton is preferred to a filter of glass wool, since the former is not etched by the hydrofluoric acid contained in the analysis stream as is the latter.

Following the acid treatment and filtration steps, the analysis stream generally has a pH on the order of about 1 to 3. Before accurate colorimetric analysis can be performed for a copper-dithiocarbamate complex in a continuous stream, the pH of the analysis stream must be raised to from about 6 to about 7 above which the absorbance of the copper-dithiocarbamate complex at 435 nm exhibits little dependence on the pH. While the absorbance of such a solution will not be materially affected by further increasing its basicity if the concentration of the complex is maintained constant, the absorbance of an analysis stream is decreased as more chelant-buffer is added in excess of that sufficient to attain the pH indicated, since the stream is unnecessarily diluted. Accordingly, it is preferred that just sufficient chelant-buffer be added to assure that the pH is maintained in the range indicated above.

The chelant-buffers of this invention which are used to adjust the analysis stream to the proper pH are selected from those reagents which will not cause turbidity in the analysis stream. It has been found that many reagents commonly used in neutralizing systems cause a precipitate to form, thus rendering the analysis stream turbid. Among those reagents which have been found to be unsatisfactory in this regard are the ammonium salts of malic, tartaric, oxalic, lactic, acetic, and triethylenetetraaminehexaacetic acids; sodium and potassium hydroxide; sodium phosphate; sodium bicarbonate; sodium borate; a mixture of acetic acid and sodium acetate; ammonium hydroxide; and triethanolamine.

The turbidity is believed attributable to an insoluble calcium-magnesium-fluoride complex which apparently forms as the pH of the analysis stream is increased. Accordingly, those neutralizing agents which do not cause turbidity and which are thus suitable for use in this invention are comprised of strong chelants capable of selectively forming, in preference to this insoluble complex, a soluble complex with the alkali earth metal cations. Reagents which have been found suitable for providing such a chelant-buffer effect include the ammonium and alkali metal salts of citric acid and the alkali metal and ammonium salts of nitrogen-containing chelants having from 1 to 5 carboxyl groups. Of these, ammonium citrate, the alkali metal salts of N,N-bis(2-hydroxyethyl) glycine, and the alkali metal and ammonium salts of each of ethylenediaminetetraacetic acid (EDTA), nitrilotriacetic acid (NTA), iminodiacetic acid, and diethylenetriaminepentaacetic acid are preferred.

In adding the chelant-buffer solution, neither the concentration per se nor the rate of addition alone is critical, so long as an adequate quantity is employed. What is adequate can readily be determined by those skilled in the art based on the teachings herein. Since the quantity of chelant-buffer required is a function both of the acidity of the analysis stream and of the amount of dissolved solids — i.e., calcium, potassium, magnesium, and the like — in the stream, an insufficient quantity will not raise the pH to the proper level, and moreover, some turbidity may occur. Temporary turbidity may be observed in some instances, for example, at a pH of slightly less than 5, but the stream clears as more chelant-buffer is added. If the remaining steps of the process are carried out following insufficient addition of chelant-buffer, inaccuracy will result for two reasons: the proper pH for stable absorption levels for the copper-dithiocarbamate complex will not have been attained, and the turbid condition will tend to cause an artificially high reading for the total copper present. An excess amount of chelant-buffer will have no detrimental effect except insofar as the stream is diluted, thereby increasing operational costs and causing a slightly low apparent copper reading.

As one specific example of the use of a chelant-buffer, an ammonium citrate solution was prepared by neutralizing a 50 weight percent aqueous solution of citric acid with about 45 weight percent ammonium hydroxide to a pH of about 9. This reagent was then added at the rate of 1.4 ml/min to a 10 ml/min analysis stream estimated to contain a maximum of about 55,000 mg/l dissolved solids.

The copper complexing reagent is comprised of a water soluble dithiocarbamate. An operative reagent is that taught in ASTM Method D1688-C, namely, bis(2-hydroxyethyl)-dithiocarbamate. That particular reagent, however, deteriorates in a matter of days. Accordingly, it is preferred to use a more stable reagent such as one prepared from te sodium salt of diethyldithiocarbamate. E. B. Sandell, in Vol. 3 of *Colorimetric Determinations of Trace Metals*, page 449 (1965), shows a 0.1% aqueous solution of the sodium salt of diethyldithiocarbamate to be satisfactory as a reagent for colorimetric determinations of copper.

While the concentration of the reagent is not critical, reagents having a dithiocarbamate concentration of from about 1 to about 3 weight percent are preferred. Use of a less concentrated reagent result in unnecessary dilution of the analysis stream. A dithiocarbamate reagent which has been used with good success comprises about 3 weight percent sodium diethyldithiocarbamate in a solvent comprised of about 6 parts water and 1 part isopropyl alcohol by volume.

The quantity of dithiocarbamate reagent employed is not critical except to the extent that above a stiochiometric amount is necessary. The actual minimum rate of addition to the analysis stream will depend in part on the concentration of the reagent and the estimated copper content of the analysis stream. Because of the relative difficulties experienced in provide means for continuously adding minute quantities of reagent solution to the analysis stream at a constant rate, it is usually convenient to add an excess of the dithiocarbamate. While some unnecessry dilution results by so doing, it is not sufficient to affect the end results appreciably. For example, if the maximum copper concentration is estimated to be 2 ppm, calculations indicate that as little as 0.012 ml/min of the above described 3% carbamate reagent is adequate for maximum complex formation in an analysis stream flowing at a rate of about 11.4 ml/min. However, in actual practice the reagent has usually been added to the analysis stream at a rate of about 0.1 ml/min. with no appreciable error in the final result.

Following treatment of the test sample as described in the foregoing paragraphs, the resulting analysis stream is directed through a stream analysis instrument having a flow-through type cell and adapted to make continuous quantitative determinations of the concentration of the copper-dithiocarbamate complex by measuring the light absorbance of the stream at about 435 nm. Of course, measurement of any other comparable optical property which is a function of the energy absorption of the solution at a given wave length, such as percent transmittance, may be utilized instead of the absorbance per se; accordingly, such related measurements are included in the term "absorbance" as used in the claims.

The readout from the stream analysis instrument may be in the form of a galvanometer deflection, but more often is a pen tracing on a strip chart recorder. In the event the stream analysis instrument is connected directly to an automated closed loop regulating device, there may be no visible readout, in which case the readout is in the form of electrical impulses transmitted by the stream analysis instrument to the automated regulating device. Regardless of the form it may take, the readout is inherently compared with a curve plotted from the results of readings obtained following similar treatment of samples of known total copper content. The total copper content of the analysis stream at any instant is thus directly determined, and by considering any systematic dilution, the total copper concentration of the bulk test stream is ascertained.

By performing the identical steps at the same concentrations and flow rates on both the known samples and on the unknown test stream sample, the same dilution factors will be present in each case. Thus, systematic error can be minimized.

The stream analysis instrument itself may be of the relatively inexpensive band pass filter type, or of the more sophisticated grating or prism types. While a high quality laboratory colorimeter or spectrophotometer having a flow-through type cell may be adapted for use as the stream analysis instrument if one wishes to use this invention for only a temporary purpose, it is preferred for economic reasons to employ less expensive equipment for this purpose if the invention is to be used for an indefinite period.

B. Apparatus

The apparatus aspect of this invention is generally depicted in FIG. 1. While the invention is hereinafter occasionally described in the context of its preferred embodiments, particularly as adapted for continuous colorimetric analysis for total copper in aqueous streams according to the hereinbefore described method, the invention is not so limited. Indeed, the apparatus has application in conjunction with any process for continuous photometric analysis employing a first reagent, and subsequently, second and third reagents.

In FIG. 1, there is depicted a cylindrical first mixing chamber 30 having a first inlet 32 and, spaced apart therefrom, a second inlet 33, each of said inlets being positioned near the bottom of said chamber, and an outlet 37 positioned near the top of said chamber. Connected to said first inlet 32 are controllable inlet means for feeding an analysis stream into said mixing chamber at a controlled, preselected rate, comprising first analysis stream conduit means 10, such as tubing, and means 15 for controlling the flow of the analysis stream through said conduit 10 into said mixing chamber 30 at a preselected rate, such as, for example, a conduit section of limited cross section having a capillary effect, a combination of an adjustable valve and a rotameter, or, a variable speed pump.

A first reagent reservoir 20 having an outlet 22 is connected to the second inlet 33 of the mixing chamber 30 by controllable inlet means comprising first reagent conduit means 23 and means 25 for controlling the rate of flow of the first reagent into the first mixing chamber. Any of the specific embodiments and their equivalents just described as means 15 for controlling the flow of the analysis stream into the first mixing chamber are also generally suited for controlling the rate of flow of the first reagent into said chamber. In this particular application, however, and in the reagent flow control means 53 and 63 hereinafter mentioned, means such as a variable speed pump, or, where the user is doing repeated work of the same nature for an extended period of time, a capillary tube which delivers an approximately constant preselected rate of fluid flow, are preferred, since the rate of flow of the reagents will in most instances be but a small fraction of that of the analysis stream. To assure maximum consistency in the quantity of reagent delivered where a capillary is used in conjunction with gravitational delivery of the reagent, it is preferred to provide a reservoir having relatively broad horizontal dimensions and a shallow vertical dimension in contrast to, say, a tall cylindrical reservoir of relatively small diameter. In so doing, the pressure of the fluid entering the capillary is essentially the same regardless of whether the reservoir is full or nearly empty.

Within the first mixing chamber 30 is provided a means for rapidly admixing the untreated analysis stream and the first reagent stream. In the particular embodiment shown in FIG. 1, a magnetic stirring bar 34 is employed (independent external drive mechanism not shown), although other mechanical means of rapid agitation are also suitable such as motor-driven rotating or oscillating paddles. Because of its simplicity of operation, a magnetic stirring bar is much preferred for this purpose, however.

The first mixing chamber, like every other part of the system, is preferably constructed of a material which is substantially inert to the particular chemicals being employed. Thus, when carrying out the analysis method hereinbefore described in which hydrofluoric acid is employed, it is preferred, for example, to construct the chamber of an acrylic plastic material rather than glass which would be etched by the acid. Neither the volume of the chamber nor mean residence time of a hypothetical aliquot of the analysis stream therein is particularly critical so long as agitation is sufficient to assure intimate mixing before the analysis stream exits from the chamber. In the context of use with the copper analysis method of this invention and other processes wherein a similar problem is presented, it is important to provide rapid agitation not only to assure adequate mixing, but also to prevent freed silica from adhering to the surfaces of the chamber.

If one desires, one or more substantially horizontally oriented baffle plates 35 having a multiplicity of perforations 36 therein may optionally be positioned so as to partition the mixing chamber into several approximately equal volume portions, thereby suppressing formation of a vortex and enhancing thorough mixing. In most instances, one such baffle placed transversely near the mid-height of said chamber as shown in FIG. 1 will be very adequate. For some applications, including the copper analysis, it is preferred that the baffle be provided with a solid non-stick surface such as tetrafluoroethylene fluorocarbon polymer or a polymerized perfluorinated ethylene-propylene resin in order to prevent deposits from adhering to the baffle. Commercially available Teflon brand fluorocarbon coatings which can be applied by methods known to the art are suitable for this purpose.

As untreated analysis stream and reagent enter under the requisite pressure near the bottom of the first mixing chamber, the admixed analysis stream exits from the chamber through the outlet 37 positioned near the top of said chamber and is carried from outlet 37 by a second analysis stream conduit means 39.

In the embodiment shown in FIG. 1, second analysis stream conduit means 39 is in communication with inlet 44 to filter means 40. While filter means is usually employed in the apparatus, and indeed is required where the apparatus is to be used according to the hereinbefore described method for determining total copper, a filter means is not essentially to the apparatus in its broadest aspects. Thus, where the stream does not carry particles which interfere with optical measurements to be performed, the filter means may be eliminated. Means 41 such as a distributing valve or sampling device may optionally be provided at a point along the second analysis stream conduit means 39 for subdividing the analysis stream and diverting a predetermined fraction of said stream to waste in order that the remaining steps of analysis may be carried out on a smaller representative sample, or for using the various subdivided portions for other purposes.

Where filter means 40 is employed, said filter means is provided with an inlet 44, an outlet 45 spaced apart therefrom, and a filter element (not shown). When the apparatus is employed in carrying out the method of the invention for continuously determining the total copper content of an aqueous stream, the filter element is as described above, namely, either a cartridge-type filter element having a pore size rating in the range of from about 0.1 microns to about 5 microns, but preferably from about 0.5 microns to about 2 microns, or, more preferably, a fibrous packing such as glass wool or cotton. In other applications wherein the stream contains suspended solids of much smaller or much larger size, this invention contemplates use of filter elements having smaller or larger pore sizes, respectively, as suited to the particular case.

Where a filter means is employed, the stream is carried from the filter means outlet 45 through a third analysis stream conduit means 46 to controllable inlet means for introducing second and third reagents into the stream at controlled, preselected rates and for intimately blending said reagents with the stream, thereby minimizing schlieren in the cell of the stream analysis instrument 90. Said third analysis stream conduit means may optionally be adapted with means 47 for further subdividing the analysis stream as described above in context of similar means 41 in second analysis stream conduit means 39. Where no filter means is employed, second analysis stream conduit means 39 may communicate with the controllable inlet means for introducing both the second and third reagents through by-pass conduit 43 and in fact, if filtration is unnecessary, the filter assembly may be omitted from the apparatus.

In the specific embodiment shown in FIG. 1, a second mixing chamber 70 is provided with first, second and third inlet means 71, 72, 73, and an outlet 74, each spaced apart from one another. Where a filter means is employed, the analysis stream is carried into said second mixing chamber by third analysis stream conduit means 46 through inlet 71; where no filter means is employed, second conduit means 39 is connected to the inlet 71.

A second reagent reservoir 50 having an outlet 51 is provided to deliver a second reagent into the second mixing chamber 70 through inlet 72 via controllable inlet means comprising second reagent conduit means 52 and means 53 for controlling the rate of flow of the second reagent into the second reagent mixing chamber. Any of the specific embodiments described above in the context of first reagent flow rate control means 25 may be employed for this purpose, as well as their equivalents. Similar controllable inlet means are provided to supply a third reagent into the second mixing chamber through inlet 73, namely, a third reagent reservoir 60 having an outlet 61, flow rate control means 63, and third reagent conduit means 62.

The second mixing chamber 70 itself, like the first mixing chamber 30 hereinbefore described, is equipped with means for rapidly agitating the stream as it passes through the chamber. Again because of simplicity, a magnetic stirring bar and corresponding independent external drive means is preferred for this purpose.

The second mixing chamber is connected through outlet 74 to a stream analysis instrument 90, having a flow-through type cell and adapted for continuous quantitative determination of light absorbance, via fourth analysis stream conduit means 75. As with each of second and third analysis stream conduit means, said fourth analysis stream conduit means may optionally be provided with means 76 for still further subdividing the analysis stream.

Figure 2:
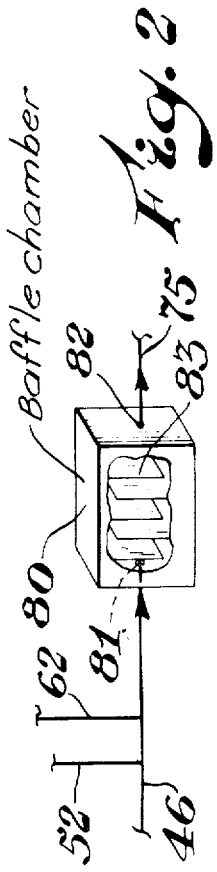
FIG. 2 is a fragmentary, schematic view, partly in perspective, and partly broken away and in section showing another embodiment of the apparatus of this invention.

In the embodiment shown in the fragmentary view of FIG. 2, the mixing chamber 70 is eliminated. Instead, the controllable inlet means for introducing second and third reagents into the analysis stream and for intimately blending said reagents with the stream is comprised of "T" or "Y" joints for connecting the second and third reagent conduit means, 52 and 62 respectively, directly to the third analysis stream conduit means 46 — or second such means 39 if no filter means is employed — followed by a baffle chamber 80 or equivalent structure to cause turbulent flow. Said baffle chamber has an inlet 81 connected to either the third analysis stream conduit means 46 — or second such means 39, depending on whether or not a filter is employed — followed by a baffle chamber 80 or equivalent structure to cause turbulent flow. Said baffle chamber has an inlet 81 connected to either the third analysis stream conduit means 46 — or second such means 39, depending on whether or not a filter is employed — and, spaced apart from said inlet 81, an outlet 82 connected to fourth analysis stream conduit means 75. Within the baffle chamber are at least one and usually a plurality of baffle plates 83 which cause the passing fluids to be intimately admixed.

Because of the relatively slow rates at which the reagents are usually added to the analysis stream, some plugging of the reagent conduits may be experienced after a period of operation using an embodiment similar to that shown in FIG. 2. Where this occurs, a Y joint between the reagent conduit and the analysis stream is preferred over a T joint, if the user wishes to inject the second and third reagent directly into the analysis stream conduit means. However, where such plugging is a problem, it is most preferred to employ a separate mechanically agitated mixing chamber as shown in FIG. 1 so that the reagents are introduced at a point where the analysis stream is moving rapidly.

The fourth analysis conduit means 75, both in the embodiments of FIG. 1 and of FIG. 2, is connected to the inlet 91 of a stream analysis instrument 90 having a flow-through type cell and adapted for continuous quantitative determination of light absorbance over a radiation band width sufficiently narrow to exclude interfering absorbance by substances which are not the intended subjects of analysis. Such instruments, more fully described in the "Method" section of this description, are per se old in the art and are readily available commercially. In most applications, it is desirable to employ the stream analysis instrument 90 in conjunction with a permanent recording device 95, though as hereinbefore set forth, the invention is not so limited. After passing through the cell of the stream analysis instrument, the analysis stream is discharged through outlet 93.

EXAMPLE

An apparatus was constructed according to the above invention, as shown generally in FIG. 1. A ball valve and rotameter were selected as the means 15 for controlling the rate of flow of incoming copper-containing analysis stream, and a variable speed peristaltic tubing pump for controlling the rate of addition of an approximately 5.4 weight percent aqueous hydrofluoric acid reagent to the first mixing chamber. The first mixing chamber was constructed of an acrylic plastic, and provided with a magnetic stirring bar. A single plate having a multiplicity of perforations therein and coated with a Teflon brand non-stick polymeric material was employed transversely across the center section of the chamber as a baffle. Packed medical grade cotton was used as a filter element.

The chelant-buffer reagent, delivered through a capillary at a constant rate of about 1.4 ml/min, was prepared by neutralizing, to a pH of about 9 with aqueous ammonium hydroxide, a 50 weight percent solution of citric acid. The third reagent, delivered at a rate of about 0.1 ml/min, also through a capillary, was an aqueous isopropyl alcohol solution containing about 3 weight percent dissolved sodium diethyldithiocarbamate. During analysis, these two reagents and approximately 10 percent of the initial analysis stream were fed into a mixing chamber provided with a magnetic stirring bar assembly.

Several copper coupons were placed in a sea water desalinization test unit equipped with means for adjusting the quantity of oxygen dissolved in the sea water being treated, and hence, its corrosive effects. A sample effluent from this test unit was fed into the first mixing chamber at about 100 ml/min along with a 3 ml/min of the hydrofluoric acid solution. The remaining reagents were added at the rates and concentrations previously mentioned. periodically, the oxygen supply was adjusted to vary the amount of copper being carried by the effluent stream. The changes in total copper concentration were observed on a strip chart recorder. Aliquots were also taken from the effluent stream at various corresponding times to compare the invention described with results obtained using a neocuproine batchwise method similar to that of ASTM D1688, Referee Method A. As shown in the accompanying table, the results obtained according to this invention were very similar to the results obtained on similar effluent samples using the much slower batchwise technique.

TABLE

| Sample Number | Dissolved Oxygen ppb | Total Copper[1] ppm Cu | Comparison Total Copper[2] ppm Cu |
|---|---|---|---|
| 1 | 180 | 0.12 | 0.15 |
| 2 | 180 | 0.10 | 0.11 |
| 3 | 330 | 0.21 | 0.22 |
| 4 | 370 | 0.26 | 0.30 |
| 5 | 370 | 0.26 | 0.26 |
| 6 | Not Determined | 0.89 | 0.92 |
| 7 | " | 0.04 | 0.03 |
| 8 | " | 0.03 | 0.03 |
| 9 | " | 0.03 | 0.02 |

TABLE-Continued

| Sample Number | Dissolved Oxygen ppb | Total Copper[1] ppm Cu | Comparison Total Copper[2] ppm Cu |
|---|---|---|---|
| 10 | " | 0.03 | 0.02 |
| 11 | " | 0.03 | 0.03 |
| 12 | " | 0.02 | 0.01 |

[1] By the continuous method and apparatus of this invention.
[2] By the neocuproine batchwise method.

Results obtained according to the invention described in close correlation to results obtained by batch analysis are also obtained on using any of the sodium salt of N,N-bis(2-hydroxyethyl) glycine and the sodium, potassium, and ammonium salts of each of the following compounds employed as the chelant-buffer reagent: ethylenediaminetetraacetic acid, nitrilotriacetic acid, iminodiacetic acid, and diethylenetriaminepentaacetic acid.

WHAT IS CLAIMED IS:

1. A method for continuously determining the total copper content of an aqueous analysis stream containing copper in at least one of ionic, particulate, and complexed forms which comprises:
   a. providing a stream analysis instrument having a flow-through type cell and adapted for continuous measurement of light absorbance at about 435 nm;
   b. contacting and intimately admixing the analysis stream with a continuous flow of hydrofluoric acid;
   c. continuously filtering the acid-treated analysis stream prior to introduction of said stream into the cell of the stream analysis instrument;
   d. continuously adding to and mixing with the analysis stream an aqueous solution of a chelant-buffer reagent selected from the group consisting of ammonium and alkali metal citrates and one of the ammonium and alkali metal salts of nitrogen-containing chelates having 1 to 5 carboxyl groups, or a mixture thereof, the quantity of the reagent being sufficient to adjust the pH of the analysis stream to from about 6 to about 7;
   e. continuously adding to and mixing with the analysis stream an aqueous solution of a water-soluble dithiocarbamate reagent whereby a complex thereof is formed with the copper present in the buffered stream;
   f. quantitatively detecting said complex by measuring, by means of the stream analysis instrument the light absorbance of the treated stream at a wave length of about 435 nm; and
   g. comparing the absorbance of the treated stream to that of similarly treated standard solutions of known total copper content to determine the total copper content of the untreated analysis stream.

2. The method of claim 1 wherein the aqueous stream contains a total copper content of from about 1 ppb to about 4 ppm total copper.

3. The method of claim 1 wherein the hydrofluoric acid is admixed with the sample stream at a flow rate such that the pH of the resulting admixture is from about 1 to about 3.

4. The method of claim 3 wherein the hydrofluoric acid is an aqueous solution of from about 2.5 to about 10 weight percent HF and the balance water.

5. The method of claim 4 wherein the rate of flow of the hydrofluoric acid stream is from about 1.5 to about 6 percent or the rate of flow of the sample stream.

6. The method of claim 4 wherein about 5.4 weight percent hydrofluoric acid is admixed with the sample stream at a flow rate about 3 percent of that of the sample stream.

7. The method of claim 1 wherein the analysis stream is filtered immediately following admixture of the analysis stream with the hydrofluoric acid.

8. The method of claim 1 wherein a cartridge filter having a pore size rating in the range of from about 0.1 micron to about 5 microns is employed in filtering the acid-treated stream.

9. The method of claim 8 wherein the pore size rating of said cartridge filter is in the range of from about 0.5 micron to about 2 microns.

10. The method of claim 1 wherein a filter comprised of glass wool is employed in filtering the acid treated stream.

11. The method of claim 1 wherein a filter comprised of packed cotton is employed in filtering the acid treated stream.

12. The method of claim 1 wherein the chelant-buffer reagent is selected from the group consisting of the ammonium and alkali metal salts of citric acid, the alkali metal salts of N,N-bis (2-hydroxyethyl)glycine, and one of the alkali metal or ammonium salts of ethylenediaminetetraacetic acid, nitrilotriacetic acid, iminodiacetic acid and diethylenetriaminepentaacetic acid, and mixtures thereof.

13. The method of claim 1 wherein the dithiocarbamate reagent is a solution of sodium diethyldithiocarbamate.

14. The method of claim 1 wherein the dithiocarbamate reagent is an aqueous isopropyl alcohol solution containing about 3 weight percent diethyldithiocarbamate salt.

15. The method of claim 1 including the additional step of subdividing the analysis stream and diverting a portion thereof for further analysis.

16. An analytical apparatus for continuously making colorometric measurements on a flowing liquid analysis stream following treatment of a liquid sample stream with a first liquid reagent, and thereafter with second and third liquid reagents, which comprises, in combination:
 a. a first mixing chamber comprising a vertically oriented container having first and second inlets near the bottom thereof and an outlet near the top thereof;
 b. means connected to the first inlet of said mixing chamber for continuously feeding the sample stream into said chamber at a contolled, preselected rate;
 c. means connected to the second inlet of said mixing chamber for continuously feeding the first liquid reagent into said chamber at a contolled, preselected rate;
 d. means connected to the outlet of said mixing chamber for removing the analysis stream from said mixing chamber;
 e. means, connected to said means for removing the analysis stream from said first mixing chamber, for continuously introducing second and third liquid reagents into the analysis stream at controlled, preselected rates;
 f. a stream analysis instrument having a flow-through type cell and adapted for continuous quantitative determination of light absorbance by a fluid stream, connected to said means for removing the analysis stream from said first mixing chamber downstream from said means for introducing second and third reagents;
 g. means for intimately blending the second and third reagents with the analysis stream prior to introduction of such stream into the cell of the stream analysis instrument.

17. The apparatus of claim 16 wherein the means recited in clause (g) comprises a second vertically oriented mixing chamber having first, second, and third inlets near the bottom thereof and an outlet near the top thereof, the first inlet being connected to the outlet of said first mixing chamber via means recited in clause (d), the second and third inlets respectively being connected to the means for continuously introducing second and third liquid reagents into the analysis stream, and the outlet of said second mixing chamber being connected to the stream analysis instrument.

18. The apparatus of claim 16 which has in addition, filter means positioned downstream from said first mixing chamber for removing optically interfering solids from the analysis stream so that a substantially clear liquid analysis stream is transmitted therethrough to the stream analysis instrument.

19. The apparatus of claim 16 which has in addition, means upstream from the stream analysis instrument for continuously subdividing the analysis stream into portions of substantially equivalent chemical composition and diverting a portion thereof to waste.

20. The apparatus of claim 16 wherein the first mixing chamber is provided with a magnetic stirring bar.

21. The apparatus of claim 16 wherein the first mixing chamber has one or more substantially horizontally oriented baffle plates, having a multiplicity of perforations therein, positioned so as to partition the mixing chamber into approximately equal portions.

22. An analytical apparatus for continuously determining the total copper content of an aqueous analysis stream containing copper in at least one of ionic, particulate and complexed forms which comprises, in combination:
 a. a first mixing chamber comprising a vertically oriented container having first and second inlets near the bottom thereof and an outlet near the top thereof;
 b. means connected to the first inlet of said mixing chamber for continuously feeding an aqueous sample stream into said chamber at a controlled, preselected rate;
 c. means connected to the second inlet of said mixing chamber for continuously feeding a first liquid reagent into said chamber at a controlled, preselected rate;
 d. means for filtering the analysis stream to remove optically interfering solids therefrom so that a substantially clear liquid analysis stream is transmitted therethrough;
 e. a second mixing chamber comprising a vertically oriented container having first, second, and third inlets near the bottom thereof and an outlet near the top thereof;

f. means connected to the second inlet of said second mixing chamber for continuously feeding a second known liquid reagent into said second mixing chamber at a controlled, preselected rate;

g. means connected to the third inlet of said second mixing chamber for continuously feeding a third known liquid reagent into said second mixing chamber at a controlled, preselected rate;

h. a stream analysis instrument having a flow-through type cell and adapted for continuous quantitiative determination of light absorbance by a fluid stream at about 435 nm;

i. conduit means serially connecting the outlet of said first mixing chamber with the first inlet of said second mixing chamber via said means for filtering, and connecting the outlet of said second mixing chamber with said stream analysis instrument.

23. The apparatus of claim 22 wherein said first mixing chamber is provided with a magnetic stirring bar.

24. The apparatus of claim 22 wherein said second mixing chamber is provided with a magnetic stirring bar.

25. The apparatus of claim 22 which has in addition, means upstream from said stream analysis instrument for continuously subdividing the analysis stream into portions of substantially equivalent chemical composition and diverting a portion thereof to waste.

26. The apparatus of claim 22 wherein said first mixing chamber is constructed from an acrylic plastic.

27. The apparatus of claim 22 wherein the first mixing chamber contains at least one substantially horizontally oriented baffle plate, having a multiplicity of perforations therein, positioned so as to partition the mixing chamber into approximately equal portions.

28. The apparatus of claim 27 wherein the baffle plate is provided with a nonstick coating selected from the group consisting of tetrafluoroethylene fluorocarbon polymers and perfluorinated ethylene-propylene resins.

29. The apparatus of claim 18 wherein the filter means comprises a vertically oriented container packed with a fibrous material and having an inlet near the bottom thereof and an outlet near the top thereof.

30. The apparatus of claim 22 wherein the filter means comprises a vertically oriented container packed with a fibrous material and having an inlet near the bottom thereof and an outlet near the top thereof.

* * * * *

UNITED STATES PATENT AND TRADEMARK OFFICE
CERTIFICATE OF CORRECTION

PATENT NO. : 3,898,042
DATED : August 5, 1975
INVENTOR(S) : Benton P. Webb et al.

It is certified that error appears in the above—identified patent and that said Letters Patent are hereby corrected as shown below:

Column 2, line 23, change "37" to --38--.

Column 8, line 10, change "te" to --the--;

Column 8, line 31, change "provide" to --providing--.

Column 12, line 24, change "I" to --"T"--;

Column 12, delete line 33 starting with "--followed" through line 37, ending with the word "employed".

Column 13, line 44, change "periodically" to --Periodically--.

Signed and Sealed this

Fifteenth Day of February 1977

[SEAL]

Attest:

RUTH C. MASON
Attesting Officer

C. MARSHALL DANN
Commissioner of Patents and Trademarks